United States Patent
Norihisa

(10) Patent No.: US 7,795,834 B2
(45) Date of Patent: Sep. 14, 2010

(54) SERVO MOTOR CONTROLLER

(75) Inventor: Takashi Norihisa, Niwa-Gun (JP)

(73) Assignee: Okuma Corporation, Niwa-gun (JP)

( * ) Notice: Subject to any disclaimer, the term of this patent is extended or adjusted under 35 U.S.C. 154(b) by 356 days.

(21) Appl. No.: 12/034,903

(22) Filed: Feb. 21, 2008

(65) Prior Publication Data

US 2008/0203959 A1 Aug. 28, 2008

(30) Foreign Application Priority Data

Feb. 26, 2007 (JP) ............................. 2007-045948

(51) Int. Cl.
*G05B 11/01* (2006.01)

(52) U.S. Cl. .................. 318/630; 318/560; 318/568.16; 318/568.18; 318/632

(58) Field of Classification Search ................ 318/560, 318/568.16, 568.18, 630, 632, 638
See application file for complete search history.

(56) References Cited

U.S. PATENT DOCUMENTS

| | | | |
|---|---|---|---|
| 5,204,602 A * | 4/1993 | Iwashita | 318/630 |
| 5,598,077 A * | 1/1997 | Matsubara et al. | 318/568.22 |
| 5,920,169 A | 7/1999 | Hamamura et al. | |
| 6,566,835 B1 * | 5/2003 | Yoshida et al. | 318/569 |
| 6,738,679 B2 * | 5/2004 | Fujita et al. | 700/56 |
| 7,205,743 B2 * | 4/2007 | Iwashita et al. | 318/568.18 |
| 7,405,525 B2 * | 7/2008 | Hoppe et al. | 318/135 |

FOREIGN PATENT DOCUMENTS

JP 10-063325 A1 3/1998

* cited by examiner

*Primary Examiner*—Bentsu Ro
*Assistant Examiner*—Thai Dinh
(74) *Attorney, Agent, or Firm*—Burr & Brown

(57) ABSTRACT

A controller includes a rotating direction detecting unit 34 to detect the rotating direction of a servo motor 6, a reversing distance computing unit 31 to compute a rotating angle of the servo motor 6, a rotation resistance computing unit 35 to compute rotation resistance on the servo motor side 6, and an elastic deformation error amount computing unit 21 to compute a deformation error amount of a ball screw 3. In the controller, when the rotating direction detecting unit 34 detects reverse of the servo motor 6, the rotation resistance computing unit 35 computes rotation resistance based on a rotating angle $\delta\theta$ of the servo motor 6 after the servo motor is reversed. The elastic deformation error amount computing unit 21 computes the elastic deformation error amount $\delta$ based on the computed rotation resistance. Thereby, a position command value inputted into the position control unit 14 can be corrected.

4 Claims, 6 Drawing Sheets

SERVO MOTOR CONTROLLER

BACKGROUND OF THE INVENTION

This application claims the benefit of Japanese Patent Application Number 2007-45948 filed on Feb. 26, 2007, the entirety of which is incorporated by reference.

1. Field of the Invention

The present invention relates to a servo motor controller (it will be called just as a controller in below) to control an operation of a servo motor provided on a machine tool or the like.

2. Description of the Background Art

In a general machine tool, a servo motor is rotated and driven so as to be able to slide a table or the like connected with a feeding shaft such as a ball screw or the like. In such a general machine tool, as positioning is made while the servo motor is reversibly rotating, an elastic deformation error, which is called as a lost motion, occurs at an elastic deformation unit of the feeding shaft or the like. Therefore, a controller in a machine tool has a correcting unit to correct the error. Here, a conventional controller in a machine tool (for example, as shown in the patent document 1) will be described referring to FIGS. 6 and 7. FIG. 6 is an explanation view illustrating a machine tool, and FIG. 7 is a block configuration diagram of a conventional controller 61.

As shown in FIG. 6, the machine tool includes a pair of brackets 72 and 72 fixed on a bed 71, and a ball screw 73 installed between the brackets 72 and 72. A nut 74 engaged with the ball screw 73 is attached with a table 75, and the table 75 is slid in the right and left directions by the ball screw 73 which is rotated by a servo motor 76. In addition, the ball screw 73 is held by the bracket 72 through a bearing which is not illustrated.

On the other hand, the controller 61 controls rotating and driving of the servo motor 76. The controller 61 assembles a position loop at which the deviation between an inputted NC position command and a position feedback signal from a position detector 62 provided at the servo motor 76 is made to be 0, and a speed loop using a speed feedback signal obtained by differentiating the position feedback signal. The controller 61 controls a torque command value of the servo motor 76 based on these two loops. Further, the controller 61 includes a forward-reverse detecting unit 63 to detect the rotating direction of the servo motor 76, and also includes a torque correcting unit 64 to correct a torque command value when the servo motor 76 is found to be reversed by the forward-reverse detecting unit 63.

In the above-described controller 61, a test run is preliminarily made and a value obtained by dividing the difference between a maximum value (TjA in FIG. 8(a)) and a minimum value (TjB in FIG. 8(b)) of a torque command value at the time of reversing by 2 is stored as a correction reference torque in a table corresponding to a feeding speed or the like. In an actual operation, when the forward-reverse detecting unit 63 detects reverse of the servo motor 76, the controller 61 reads a correction reference torque corresponding to a feeding speed at the time of reverse and corrects a torque command value. FIG. 8A illustrates changes of a torque command signal in the test run.

[Patent Document 1] Japanese Unexamined Patent Publication No. 1998-63325

The controller carries out correction based on a finally converging torque command value after the servo motor is reversed as illustrated in FIG. 8A. The correction is carried out with estimation of an elastic deformation error regarding that a torque is varied in a staircase pattern according to the reverse of the motor as illustrated in FIG. 8B. However, a torque does not actually reverse in a staircase pattern after the servo motor is reversed but gradually increases in the reversing direction so as to converge to a final torque value. Therefore, in the conventional controller, an estimation error occurs during the period from reversing of a servo motor to converging of a torque value to be a predetermined value, and thus an accuracy of positioning may decrease.

Further, in a case where a servo motor is reversed, there is a torque not working on an elastic deformation part such as a ball screw or the like, for example, rotation resistance in a bearing of a ball screw. Therefore, it is desired to estimate an elastic deformation error considering the torque not working on the elastic deformation unit or the like.

SUMMARY OF THE INVENTION

The present invention is to provide a controller capable of estimating an elastic deformation error more correctly and more improving the accuracy of positioning.

To achieve the above object, a first aspect of the present invention is a servo motor controller to correct a position of a moving object connected with a servo motor through an elastic body, based on a torque command value of the servo motor. The servo motor includes a rotating direction detecting unit to detect the rotating direction of the servo motor, a rotating angle computing unit to compute the rotating angle of the servo motor, a rotation resistance computing unit to compute rotation resistance on the servo motor side, and an elastic deformation error amount computing unit to compute a deformation error amount of an elastic body. The controller corrects the position of the moving object by the steps of detecting a reverse of the servo motor in the rotating direction detecting unit, computing rotation resistance in the rotation resistance computing unit based on a rotating angle of the reversed servo motor, and computing the deformation error amount of the elastic body in the elastic deformation error amount computing unit based on the computed rotation resistance and the torque command value of the servo motor.

A second aspect of the present invention is the servo motor according to the first aspect, the rotation resistance computing unit computes rotation resistance using the following formula 1.

In the formula, $T_{Amp}$ indicates a finally converging rotation resistance which is a fixed number, and $\delta\theta_0$ indicates a rotating angle whish is also a fixed number, which makes rotation resistance to be 0 after the servo motor is reversed. Further, $\delta\theta$ indicates a rotating angle computed in the rotating angle computing unit.

$$T_{Brg} = 2 \cdot T_{Amp} \cdot \frac{\delta\theta}{(\delta\theta + \delta\theta_0)} - T_{Amp} \qquad \text{[Formula 1]}$$

A third aspect of the present invention is the servo motor according to the first aspect including a rotating direction computing unit showing the rotating direction of the servo motor with a code, and a reverse rotation resistance storage unit to store rotation resistance at the time of reversing. In the controller, when the rotating direction detecting unit detects that the servo motor is reversed, the reverse rotation resistance storage unit once stores the rotation resistance at the time of reverse, and then the rotation resistance computing unit computes rotation resistance based on a rotating angle of the reversed servo motor, the rotating direction of the servo motor, and the rotation resistance stored in the reverse rotation resistance storage unit.

A fourth aspect of the present invention is the serve motor according to the third aspect, where the rotation resistance computing unit computes rotation resistance by the following formula 2. In the formula, sign ($\dot{\theta}$) indicates a function computed in the rotating direction computing unit, and $T_{reverse}$ indicates rotation resistance stored in the reverse rotation resistance storage unit.

$$T_{Brg} = \text{sign}(\dot{\theta}) \cdot 2 \cdot T_{Amp} \cdot \frac{\delta\theta}{(\delta\theta + \delta\theta_0)} + T_{reverse} \quad \text{[Formula 2]}$$

wherein provided that $|T_{Brg}| > |T_{Amp}|$, $T_{Brg} = \text{sign}(\dot{\theta}) \cdot T_{Amp}$ According to the present invention, since the elastic deformation error amount is computed considering a torque, which is rotation resistance on the servo motor side, not working on an elastic deformation part such as a ball screw or the like, the elastic deformation error amount can be estimated more correctly, and thus the accuracy of positioning a moving object can be improved.

Further, when the servo motor is reversed, rotation resistance is computed based on a rotating angle of the reversed servo motor. Thus, the present invention can compute an elastic deformation error amount δ more correctly than a conventional controller does, in which torque correction is carried out regarding that rotation resistance is reversed in a staircase pattern at the time when the servo motor is reversed. Thus, accuracy of positioning can be more improved.

Furthermore, according to the inventions of the third and fourth aspects, when the servo motor is reversed, rotation resistance is computed based on a rotating angle of the reversed servo motor, a rotating direction of the servo motor, and rotation resistance stored in a reverse rotation resistance storage unit. Thus, in such a case where the servo motor is once reversed and then immediately reversed again, the elastic deformation error amount δ can be estimated more correctly, and the accuracy of positioning can be more improved.

DESCRIPTION OF THE PREFERRED EMBODIMENTS

Figure 1:
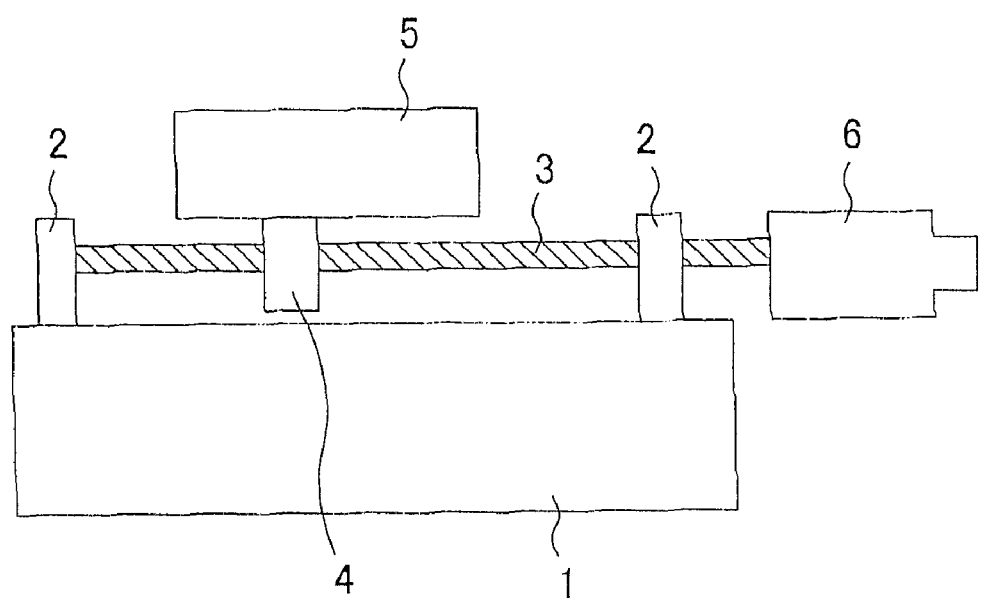
FIG. 1 is an explanation view to illustrate a machine tool including a controller according to the present invention.

A controller as an embodiment of the present invention will be described below referring to the drawings.

FIG. 1 is an explanation view to illustrate a machine tool having a controller according to the present invention.

A machine tool includes a pair of brackets 2 and 2 erected on a bed 1, and the brackets 2 and 2 include a ball screw (an elastic body) 3 held as an elastic deformation part through a bearing which is not illustrated. Further, the machine tool includes a table (moving object) 5 attached through a nut 4 engaged with the ball screw 3. By rotating and driving of a servo motor 6, the table 5 can be slid in the right and left directions in FIG. 1.

Figure 2:
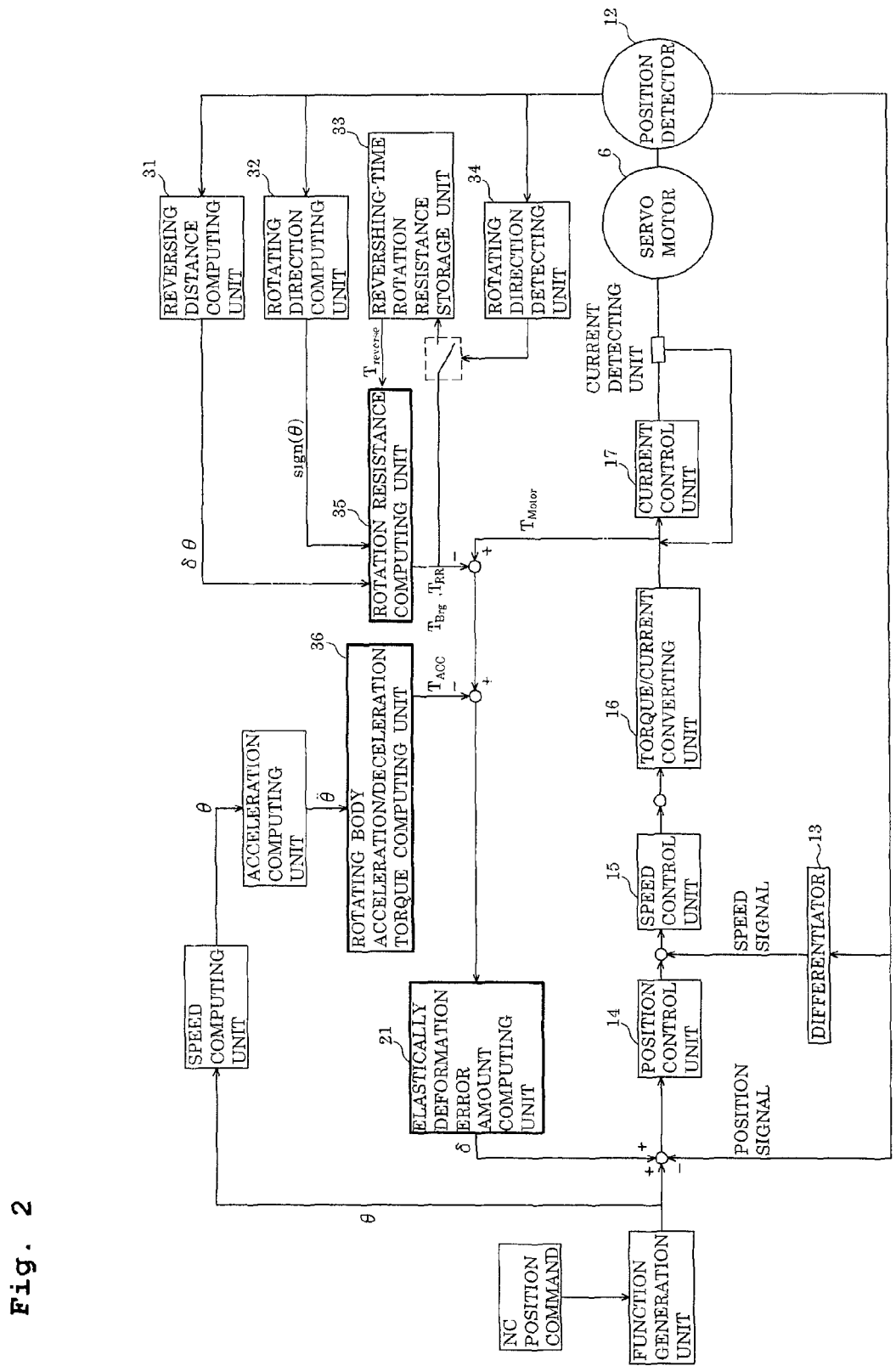
FIG. 2 is a block configuration diagram of a controller to control rotating and driving of a servo motor 6 in a machine tool.

FIG. 2 is a block configuration diagram of a controller to control rotating and driving of the servo motor 6 in the machine tool.

The controller assembles a position loop at which the deviation between an NC position command inputted from an NC apparatus not illustrated and a position feedback signal from a position detector 12 provided at the servo motor 6 makes to be 0. Further, the controller also assembles a speed loop at an inside of the position loop, and the speed loop is to compare a speed feedback signal and an output signal from a position control unit 14 in a speed control unit 15. The speed feedback signal is obtained by differentiating the position feedback signal by a differentiator 13. In addition, an output from the speed controlling unit 15 is converted to a torque command in a torque/current conversion unit 16, and the torque command is outputted to the servo motor 6 through a current control unit 17.

On the other hand, the controller assembles a torque loop to estimate an elastic deformation error amount δ based on the feedback signal of the torque command outputted from the torque/current conversion unit 16 and the position feedback signal from the position detector 12. An elastic deformation error amount computing unit (it will be called as a computing unit in below) 21 computes the elastic deformation error amount δ of the ball screw 3. In addition, a reversing distance computing unit (a rotating angle computing unit) 31 computes a rotating angle δθ after the servo motor is reversed, based on the feedback signal from the position detector 12. A rotating direction computing unit 32 computes the rotating direction sign ($\dot{\theta}$) based on the feedback signal from the position detector 12. A reverse rotation resistance storage unit 33 stores rotation resistance $T_{reverse}$ at the time when the servo motor is reversed. A rotating direction detecting unit 34 detects reversing of the servo motor 6. A rotation resistance computing unit 35 computes rotation resistance $T_{Brg}$ (or $T_{RR}$) on a bearing or the like. A rotating body acceleration/deceleration torque computing unit 36 computes a required acceleration/deceleration torque $T_{ACC}$ to accelerate objects except a table, e.g., a motor, a ball screw and the like, based on an NC position command.

Further, the controller controls rotating and driving of the servo motor 6 while correcting a torque command based on feedback signals from each loop, estimating force applied to an elastic body correctly, and correcting a position command value inputted into the position control unit 14.

Here, a torque loop to compute the elastic deformation error amount δ will be described in detail below.

Figure 3:
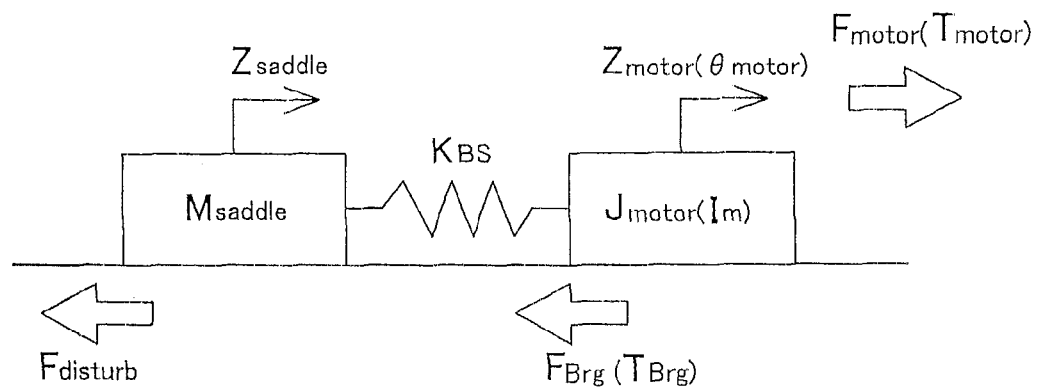
FIG. 3 is an explanation view of the modeled machine tool illustrated in FIG. 1.

FIG. 1 illustrates a modeled machine tool where an elastic deformation error amount δ is estimated. In the model illustrated in FIG. 3, a position, inertia, frictional force of a bearing or the like, are expressed with a linear axis.

With regard to force F applied to an elastic deformation part (the ball screw unit 3), the following formula (1) is obtained by considering frictional force $F_{Brg}$ in a TAC bearing holding the ball screw 3 and a motor bearing. In other words, the balance of force shown in the following formula (1) is obtained by considering rotation resistance not working to an elastic deformation.

[Formula 3]

$$F = F_{disturb} + M_{saddle} \cdot \ddot{Z}_{saddle} = F_{motor} - J_{motor} \cdot \ddot{Z}_{motor} - F_{Brg} \quad (1)$$

Further, when the elastic deformation error amount is indicated as $\delta$, $F = K_{BS} \cdot \delta$ ($K_{BS}$ is an elastic coefficient of the ball screw 3). Thus, the elastic deformation error amount $\delta$ can be expressed with the following formula (2)

[Formula 4]

$$\delta = \frac{F}{K_{BS}} = \frac{F_{motor} - J_{motor} \cdot \ddot{Z}_{motor} - F_{Brg}}{K_{BS}} \quad (2)$$

Further, each parameter in the formula (1) can be converted to rotation systems shown in the following formulae (3) to (5) by using a pitch P of the ball screw 3.

[Formula 5]

$$F_{motor} = \frac{2\pi}{P} \cdot T_{motor} \quad (3)$$

$$J_{motor} \cdot \ddot{Z}_{saddle} = \frac{2\pi}{P} \cdot I_{motor} \cdot \ddot{\theta}_{motor} \quad (4)$$

$$F_{Brg} = \frac{2\pi}{P} \cdot T_{Brg} \quad (5)$$

Therefore, when the formulae (3) to (5) are substituted in the formula (2), the elastic deformation error amount $\delta$ can be expressed with the following formula (6) finally.

[Formula 6]

$$\delta = C_{BS} \cdot (T_{motor} - I_{motor} \cdot \ddot{\theta}_{motor} - F_{Brg}) \quad (6)$$
$$\because C_{BS} = \frac{2\pi}{P} \cdot \frac{1}{K_{BS}}$$

Clearly from the above formula (6), when the elastic deformation error amount $\delta$ is estimated, it is necessary to obtain the rotation resistance $T_{Brg}(F_{Brg})$ on the servo motor 6 side. Further, as for $T_{Brg}$ at the time when the servo motor 6 is reversed, inventors resulted that a code of rotation resistance is not reversed simultaneously with reverse rotation. Instead, the rotation resistance $T_{Brg}$ on the servo motor 6 side gradually changes as shown in a curve in FIG. 4, and converges to fixed rotation resistance ($T_{Amp}$) corresponding to a rotating angle $\delta\theta$ after the servo motor is reversed. The curve in FIG. 4 can be expressed by the following formula (7). Thus, a rotation resistance computing unit 35 computes rotation resistance $T_{Brg}$ based on the formula (7). In addition, $\delta\theta_0$ in the formulae (7) indicates a rotating angle at which rotation resistance becomes to be 0 after the reverse of the motor.

[Formula 7]

$$T_{Brg} = 2 \cdot T_{Amp} \cdot \frac{\delta\theta}{(\delta\theta + \delta\theta_0)} - T_{Amp} \quad (7)$$

Figure 5:
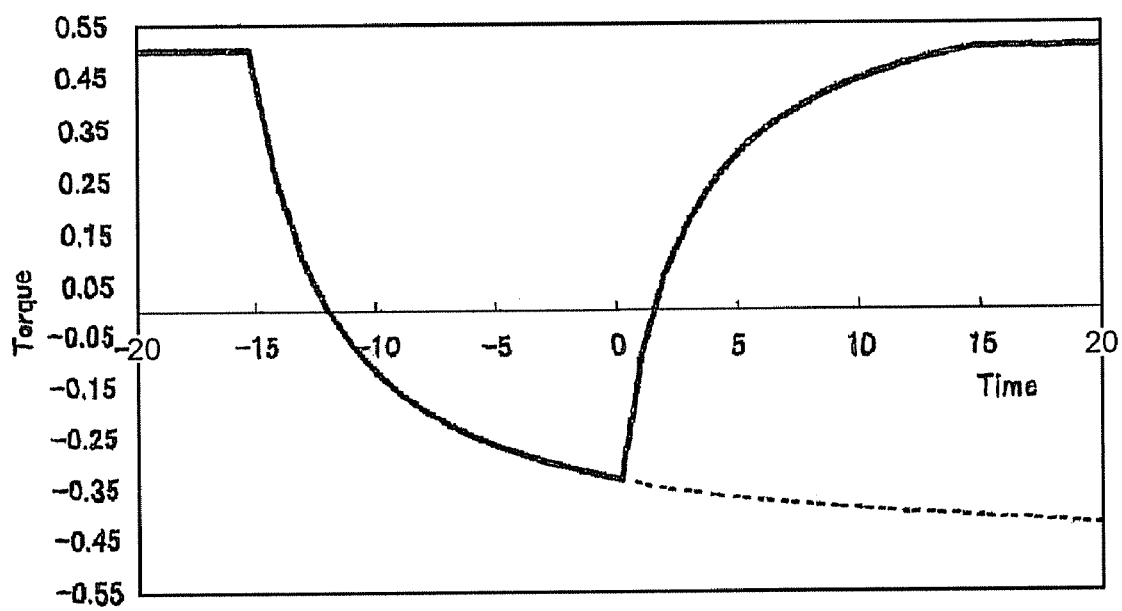
FIG. 5 is a graph to illustrate variation of the rotation resistance.
Figure 6:
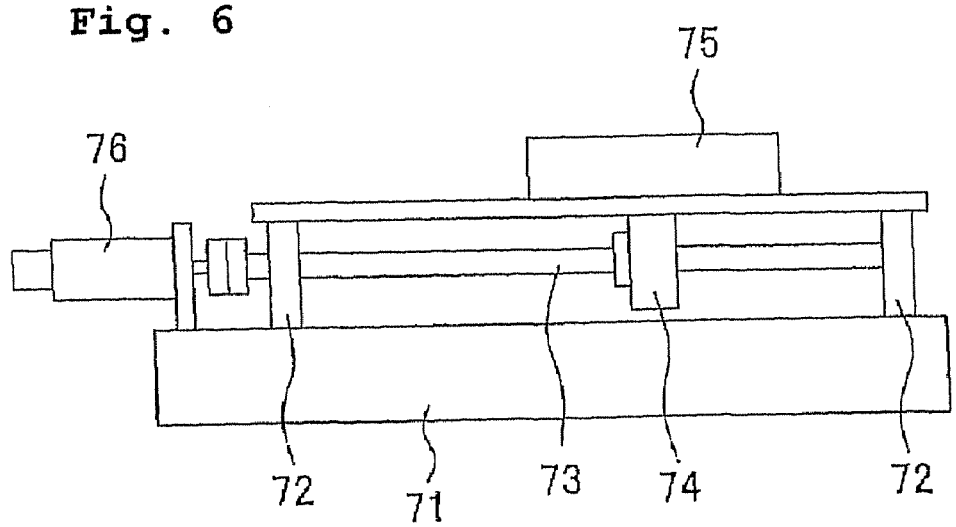
FIG. 6 is an explanation view to illustrate a conventional machine tool.
Figure 7:
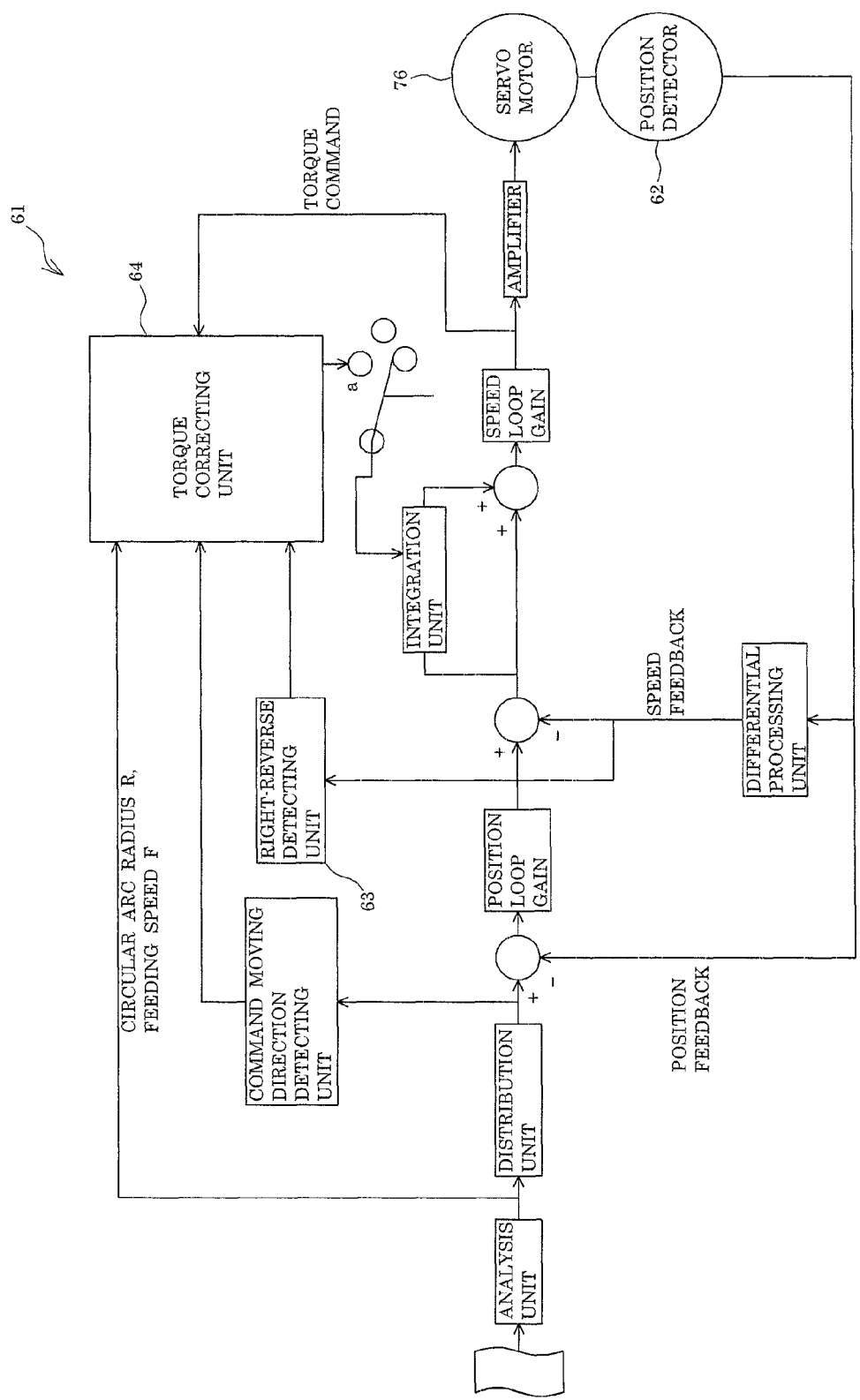
FIG. 7 is a block configuration diagram of a conventional controller.
Figure 8:
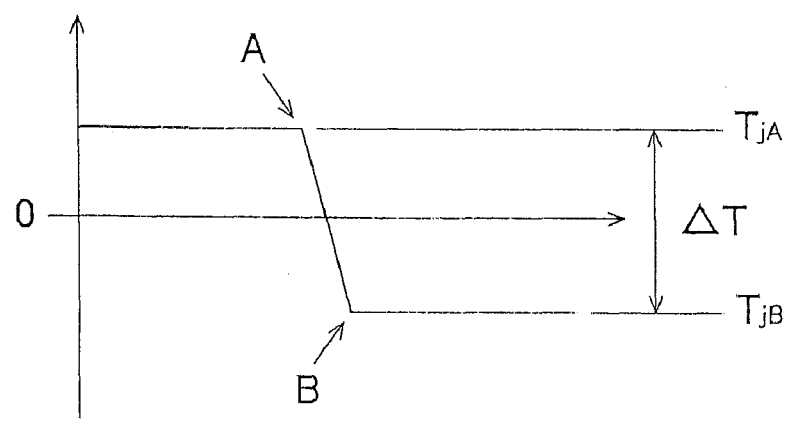
FIG. 8 is a graph to illustrate variation of conventional rotation resistance.
Figure 8:
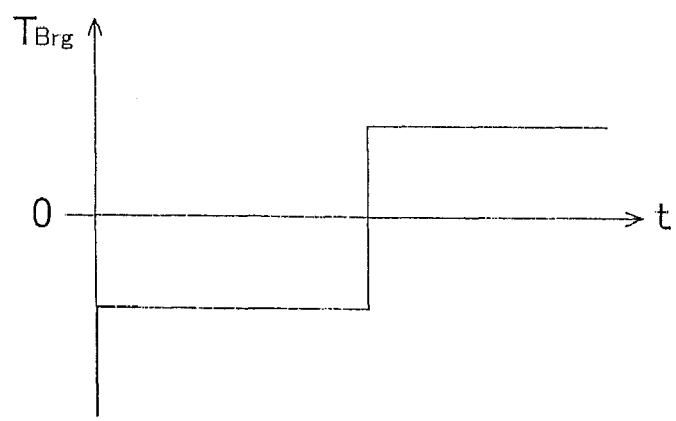

Rotation resistance in which the servo motor is reversed after the rotation resistance converges to an approximately fixed value, can be computed by the above formulae (7). However, when the servo motor 6 is reversed again before the rotation resistance converges to be a fixed value, that is, the servo motor 6 is once reversed and then reversed again, the rotation resistance $T_{Brg}$ changes, for example, in a curve illustrated in FIG. 5. In such case, the rotation resistance $T_{Brg}$ can be estimated more correctly by computing with the following formula (8).

[Formula 8]

$$T_{Brg} = \text{sign}(\dot{\theta}) \cdot T_{Amp} \cdot \frac{(\delta\theta - \delta\theta_0)}{(\delta\theta + \delta\theta_0)} + T_{reverse} \quad (8)$$

wherein provided that $|T_{Brg}| > |T_{Amp}|$, $T_{Brg} = \text{sign}(\dot{\theta}) \cdot T_{Amp}$ (9)

$T_{reverse}$ in the above-formula (8) indicates rotation resistance at the time of reversing. When the rotating direction detecting unit 34 detects that the servo motor is reversed, $T_{reverse}$ at the time of reverse is stored in the reverse rotation resistance storage unit 33, and is used to compute the rotation resistance $T_{Brg}$ in the formula (8). Further, sign ($\dot{\theta}$) indicates a function which expresses the rotating direction with only plus-or-minus codes, and is computed in the rotating direction computing unit 32. In addition, when there is rotation resistance depending on only the rotating direction, and not having rotating direction dependency such as contact sealing, the rotation resistance is pre-stored in the rotation resistance computing unit 35 as a parameter, and then the rotation resistance $T_{RR}$ can be computed by the following formula (10).

[Formula 9]

$$T_{RR} = T_{Brg} + \text{sign}(\dot{\theta}) \cdot T_{fric} \quad (10)$$

As described above, the rotation resistance computing unit 35 computes the rotation resistance $T_{Brg}$ or $T_{RR}$ to be inputted into a computing unit 21. Further, $I_{motor} \cdot \ddot{\theta}_{motor}$ which is required to compute elastic deformation error amount $\delta$ using the above formula (6) is computed in the rotating body acceleration/deceleration torque computing unit 36 based on an NC position command, and is inputted into the computing unit 21. In addition, an acceleration/deceleration torque $T_{ACC}$ is $I_{motor} \cdot \ddot{\theta}_{motor}$. Further, when rotation resistance is computed, it may be set in advance which formula is used, (7) or (8), corresponding to a processing mode before processing. Further, when the rotating angle $\delta\theta$ is a predetermined value or less, the formula (8) may be selected.

Furthermore, the computing unit 21 computes the elastic deformation error amount $\delta$ based on the inputted rotation resistance $T_{Brg}$ or $T_{RR}$, the acceleration/deceleration torque $T_{ACC}$, and the torque command value $T_{motor}$, and then the computing unit 21 feedbacks it to the position control unit 14. Thereby, a torque command considering a position deviation based on elastic deformation is outputted to the servo motor 6.

According to a controller performing the above-described correction, the elastic deformation error amount $\delta$ can be computed considering a torque not working on the elastic deformation part which is rotation resistance on the servo motor 6 side, for example, the ball screw 3 or the like. Thus, the elastic deformation error amount $\delta$ can be estimated more correctly than a conventional controller does, and the accuracy of positioning such as the table 5 or the like can be improved.

Figure 4:
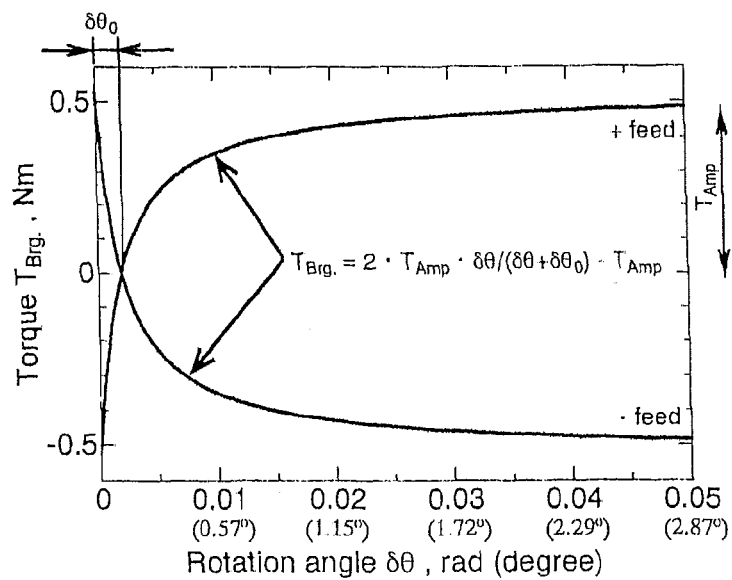
FIG. 4 is a graph to illustrate variation of rotation resistance.

Further, since the rotation resistance $T_{Brg}$ on the servo motor side is computed by the formula (7) based on the curve illustrated in FIG. 4, the elastically deformation error amount $\delta$ can be computed more correctly by the present invention than the conventional controller where torque correction is carried out regarding that rotation resistance is reversed in a staircase pattern when the servo motor 6 is reversed, and thus the accuracy of positioning can be more improved.

Furthermore, when the servo motor 6 is once reversed and then immediately reversed again, the rotation resistance $T_{Brg}$ (or $T_{RR}$) can be computed by the formula (8) (or formula (10)). Thus, the elastic deformation error amount δ can be estimated more correctly, and thus the accuracy of positioning can be more improved.

In addition, a controller of the present invention can be applied not only to a machine tool having a feeding shaft using the ball screw described in the above-described embodiment, but also applied to a machine tool having a direct drive-type rotating shaft as an elastic deformation unit.

What is claimed is:

1. A servo motor controller to correct a position of a moving object connected with the servo motor through an elastic body based on a torque command value of the servo motor, the servo motor controller comprising:
    a rotating direction detecting unit to detect a rotating direction of the servo motor;
    a rotating angle computing unit to compute a rotating angle of the servo motor;
    a rotation resistance computing unit to compute rotation resistance on the servo motor side; and
    an elastic deformation error amount computing unit to compute a deformation error amount of the elastic body,
    wherein the controller corrects a position of the moving object by the steps of;
    detecting the reverse of the servo motor in the rotating direction detecting unit;
    computing rotation resistance in the rotation resistance computing unit based on a rotating angle of the reversed servo motor; and
    computing the elastic deformation error amount in the elastic deformation error amount computing unit based on the computed rotation resistance and the torque command value of the servo motor.

2. The servo motor controller according to claim 1, wherein the rotation resistance computing unit computes rotation resistance by the following formula:

$$T_{Brg} = 2 \cdot T_{Amp} \cdot \frac{\delta\theta}{(\delta\theta + \delta\theta_0)} - T_{Amp}.$$

3. The servo motor controller according to claim 1, the controller comprising:
    a rotating direction computing unit showing the rotating direction of the servo motor with a code; and
    a reverse rotation resistance storage unit to store rotation resistance at the time of reversing,
    wherein when the rotating direction detecting unit detects reverse of the servo motor, the reverse rotation resistance storage unit once stores rotation resistance at the time of reversing, and the rotation resistance computing unit computes rotation resistance based on a rotating angle of the reversed servo motor, the rotating direction of the servo motor, and the rotation resistance stored in the reverse rotation resistance storage unit.

4. The servo motor controller according to claim 3, wherein the rotation resistance computing unit computes rotation resistance by the following formula $$T_{Brg} = \text{sign}(\dot{\theta}) \cdot T_{Amp} \cdot \frac{\delta\theta}{(\delta\theta + \delta\theta_0)} + T_{reverse}$$

wherein provided that $|T_{Brg}|>|T_{Amp}|$, $T_{Brg}=\text{sign}(\dot{\theta})\cdot 2\cdot T_{Amp}$.

* * * * *